United States Patent [19]

Prochazka et al.

[11] 4,108,929

[45] Aug. 22, 1978

[54] HOT PRESSED SILICON CARBIDE

[75] Inventors: Svante Prochazka, Ballston Lake; William J. Dondalski, Schenectady, both of N.Y.

[73] Assignee: General Electric Company, Schenectady, N.Y.

[21] Appl. No.: 695,246

[22] Filed: Jun. 11, 1976

Related U.S. Application Data

[60] Continuation of Ser. No. 503,008, Sep. 3, 1974, abandoned, which is a division of Ser. No. 378,918, Jul. 13, 1973.

[51] Int. Cl.² .............................................. C04B 35/52
[52] U.S. Cl. ..................... 264/29.1; 106/44; 264/29.6; 264/61; 264/63; 264/85; 264/332
[58] Field of Search ............... 264/65, 332, 85, 29.1, 264/29.6

[56] References Cited

U.S. PATENT DOCUMENTS

| | | | |
|---|---|---|---|
| 3,442,989 | 5/1969 | Hildebrandt | 106/44 |
| 3,853,566 | 12/1974 | Prochazka | 106/44 |
| 4,044,110 | 8/1977 | Noakes et al. | 264/29.1 |

*Primary Examiner*—Robert F. White
*Assistant Examiner*—John A. Parrish
*Attorney, Agent, or Firm*—Jane M. Binkowski; Joseph T. Cohen; Charles T. Watts

[57] ABSTRACT

A dense silicon carbide having improved properties is disclosed which is prepared by the addition of a carbonaceous additive to a boron doped silicon carbide and hot pressing the mixture at a sufficient temperature and pressure whereby a dense substantially nonporous ceramic is formed.

7 Claims, 3 Drawing Figures

HOT PRESSED SILICON CARBIDE

The invention herein described was made in the course of or under a contract or subcontract thereunder (or grant) with the Department of the Navy.

This is a continuation, of application serial No. 503,008, now abandoned, filed Sept. 3, 1974 which is a division of application Ser. No. 378,918 filed July 13, 1973.

The chemical and physical properties of silicon carbide make it an excellent material for high temperature structural applications. These properties include good oxidation resistance and corrosion behavior, good heat transfer coefficients, low expansion coefficient, high thermal shock resistance and high strength at elevated temperature. This unique combination of properties suggests the use of silicon carbide as components for gas turbines, check valves for handling corrosive liquids, linings of ball mills, heat exchangers for high temperature furnaces, pumps for die casting machines and combustion tubes.

Heretofore, hot pressing of silicon carbide was used to produce small specimens under closely controlled conditions. Unfortunately, silicon carbide is not easily sintered to densities approaching the theoretical density of 3.21 grams per cubic centimeter. A method of hot pressing silicon carbide to uniform densities on the order of 98% of the theoretical density with slight additions of aluminum and iron aiding in densification is disclosed by Alliegro et al., J. Ceram. Soc., Vol. 39, 11 (November 1956), pages 386-389. It was found that dense hot pressed silicon carbide containing 1% by weight of aluminum had a modulus rupture of 54,000 psi at room temperature and 70,000 psi at 1,371° C. However, it was also reported that the density of hot pressed silicon carbide containing 3 mole percent boron was substantially equivalent, i.e. 2.7 grams per cc., to silicon carbide obtainable without impurities or additives.

In the copending application of Prochazka entitled HOT PRESSED SILICON CARBIDE, Ser. No. 317,426, filed Dec. 21, 1972, now U.S. Pat. No. 3,853,566, which by reference is incorporated in the present application, there is described an improved method of making a dense silicon carbide ceramic by forming a homogeneous dispersion of a submicron powder of silicon carbide and a boron containing additive, e.g. elemental boron or boron carbide, and hot pressing the dispersion at a temperature of about 1900°-2000° C. and at a pressure of about 5,000-10,000 psi for a sufficient time to produce a dense nonporous silicon carbide ceramic. The advantage of boron as a sintering aid, in comparison to other materials such as alumina, aluminum nitride and other metallic compounds, is that boron provides increased oxidation and corrosion resistance at elevated temperature. This may be explained by the fact that at high temperatures boron oxidizes to $B_2O_3$, which is volatile and evaporates, leaving the surface of the silicon carbide body coated with pure silica which provides protection to further oxidation. Aluminum additions, on the other hand form alumina on oxidation which alloys the protective silica coating on the silicon carbide surface, decreases its viscosity and thus degrades the resistance to oxidation. It is essential that the powder dispersion used in the process described in the copending application be a mixture of submicron sized particles in order to obtain the high densities and strengths upon hot pressing. These fine powders, however, tend to retain large amounts of oxygen which will vary to some extent depending on the technique of preparation. Thus, for instance, wet ball milled, commercial abrasive grade silicon carbide having an average particle size of about 1.5 microns contains about 3.5% oxygen, whereas a silicon carbide powder obtained by the reduction of silica gel by carbon typically contains up to 5.0% oxygen. This oxygen is present as silica which is strongly bonded to the silicon carbide and, in most cases, cannot be desorbed. On hot pressing, some of the silica is incorporated into the product and forms a second phase distributed along the edges of the silicon carbide grains. The amount of oxygen introduced into the material depends essentially on the partial pressure of carbon monoxide and silicon monoxide within the powder during heating up to the hot pressing temperature. When the pressure is high, the silica will be stable and is found as a glassy phase in the product. At low gas pressures, on the other hand, the silica will react with silicon carbide to form metallic silicon. Both the silica and silicon secondary phases affect high temperature mechanical properties, especially creep resistance and static fatigue. It is likely that small amounts of these phases present in hot pressed boron doped silicon carbide limit the high temperature properties of the material.

Very fine silicon carbide powders have been used to allow densification at the lowest possible temperature and to refine microstructures in order to increase mechanical properties. However with submicron silicon carbide powders, the development of the microstructure on hot pressing is difficult to control and often exaggerated grain growth degrades the mechanical properties of the hot pressed material. This exaggerated grain growth is accompanied by a crystallographic transformation in silicon carbide at high temperatures from the $\beta$-SiC cubic starting material to the hexagonal $\alpha$-6H-SiC. The hexagonal silicon carbide tends to grow into large tabular grains which become strength limiting.

In accordance with the present invention, we have discovered a method of making a dense silicon carbide ceramic body by forming a substantially homogeneous dispersion of a submicron powder of silicon carbide, a boron-containing additive and a carbonaceous additive. The dispersion is then hot pressed in an inert atmosphere at a temperature of about 1900°-2000° C. at a pressure of about 5,000-10,000 psi for a sufficient time to produce a highly dense ceramic body. The product obtained has a density of at least about 98% of the theoretical density, contains no glassy phase, and has a fine-grain uniform microstructure without the presence of exaggerated grain growth. It is suitable as an engineering material such as, for example, in high temperature gas turbine applications.

The invention is more clearly understood from the following description taken in conjunction with the accompanying drawing in which.

Figure 1:
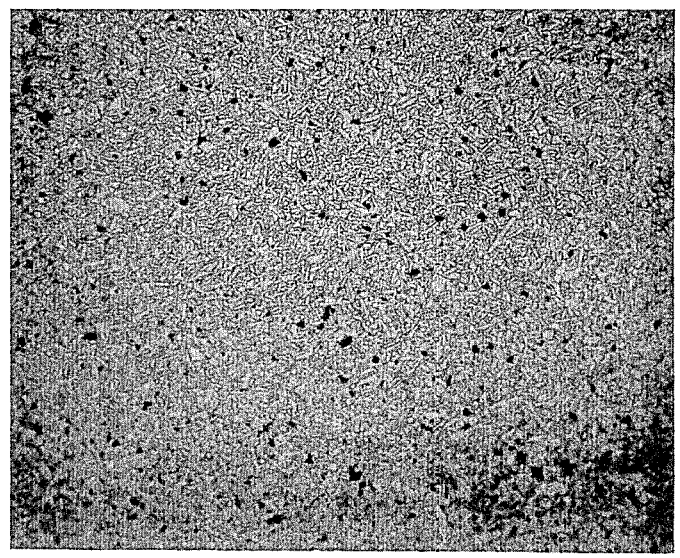
FIG. 1 is a photomicrograph of hot pressed silicon carbide doped with boron and containing carbon prepared according to the process of the present invention.

It is essential that the powder dispersion is a mixture of submicron particle size powders in order to obtain the high densities and strengths upon hot pressing. These may be obtained by different techniques as, for instance, by direct synthesis of a powder mixture of elements or by carbon reduction of silica.

A process for preparing silicon carbide powder with excellent sintering properties is disclosed by Prener in U.S. Pat. No. 3,085,863 entitled METHOD OF MAKING SILICON CARBIDE. The patent teaches a process of making pure silicon carbide which includes the steps of forming a silica gel in sugar solution, dehydrating the gel to decompose the sugar and to form a homogeneous, intimate, finely divided mixture of silica and carbon, and heating the mixture in an inert atmosphere to form silicon carbide. We have found that it is preferable to modify this procedure by substituting ethylsilicate for the silicon tetrachloride to eliminate the inconvenience of vast amounts of hydrochloric acid released on hydrolysis.

The boron containing additive may be in the form of a submicron sized powder and further may be either as elemental boron or boron carbide. Alternatively, the boron may be added directly to the silica gel in the form of a boron compound, such as boric acid during the preparation of the silicon carbide powder. In order to obtain densification, the amount of boron containing additive is critical, the amount of the additive being equivalent to about 0.3–3.0% by weight of elemental boron. Experiments on pressure sintering of silicon carbide with the boron containing addition indicate that there is a lower limit of efficiency below which there is essentially no effect. This critical concentration appears to be equivalent to between 0.3–0.4% by weight of boron. When this concentration is exceeded, full densification is obtained in submicron powders at 1950° C. and a pressure of 5–10 K psi. A further increase in boron concentration does not bring about enhancement of densification, and, when the amount is equivalent to more than 3.0% by weight of boron, exaggerated grain growth occurs together with loss of strength and oxidation resistance. The optimum amount is about equivalent to one part by weight boron per 100 parts of silicon carbide.

This behavior is probably related to the solubility limit of boron in silicon carbide which has to be exceeded in order to get segregation of boron at grain boundaries and the resulting effect. However, as there are limitations to the degree of dispersion of boron in the silicon carbide powder which can be achieved, it is advantageous to slightly exceed the lower limit of effectiveness of boron. This brings about safe densification throughout the compact and eliminates islands of lower densification which may form with low concentrations and incomplete mixings. Thus, for the most part, an amount equivalent to 1% by weight of boron is the minimal addition when elemental boron powder is mechanically mixed with silicon carbide powders. On the other hand, when boron is introduced as a solution of a boron compound into the silica gel during preparation of silicon carbide powders, the most desirable dispersion is achieved and an addition of only an amount equivalent to 0.4% by weight of boron gives satisfactory results.

The critical part of this invention involves the incorporation of a carbonaceous additive into the submicron powder dispersion to suppress the exaggerated grain growth in the microstructure. Previously, exaggerated grain growth had been a critical problem because large grains are strength limiting. Exaggerated grain growth of large tabular crystals is linked to the $\beta$-$\alpha$ silicon carbide transformation and proceeds by a mechanism involving small amounts of oxygen and a silicon metal phase. Carbon additions suppress this anomalous grain growth probably by the removal of residual oxygen. In order to obtain the beneficial effect, there must be a certain amount of carbon present in the homogeneous powder dispersion after pyrolysis. Some of the carbon is, of course, lost on pyrolysis and this may vary depending on the heating rate and various other factors. However, the carbon content of the powder dispersion after pyrolysis should be about in the range of 0.5–3.0% by weight. More than 3% by weight leads to poor microstructure, coarsening of the grains and inclusions of carbon which are expected to cause a decrease in strength properties, whereas less than 0.5% by weight has no significant effect. The preferred amount is such that the amount of carbon present after pyrolysis is about 1% by weight.

Since we are concerned with the carbon material after pyrolysis, there are certain general functional criteria which may be used to describe the characteristics of the carbonaceous additive. Firstly, compounds which readily crystallize from solutions, such as sugar from an aqueous solution, will tend to precipitate as crystals during evaporation of the solvent. Such crystals turn into relatively large carbon particles on pyrolysis and form undesirable inclusions in the microstructure of the final product. Hence, compounds which do not crystallize from solution are preferred. Secondly, compounds derived from aliphatic hydrocarbons give low yields of carbon which moreover varies with the rate of heating, so that no exact control may be exercised over the carbon addition. The low yield is therefore another serious limitation. For instance, acrylic resins which yield about 10% carbon on pyrolysis are not effective.

High molecular weight aromatic compounds are the preferred material for making the carbon addition since these give high yield of carbon on pyrolysis and do not crystallize. Thus, for instance, a phenol-formaldehyde condensate-novolak which is soluble in acetone or higher alcohols, such as butyl alcohol, may be used as well as many of the related condensation products, such as resorcinol-formaldehyde, aniline-formaldehyde, cresol-formaldehyde, etc. Similar compounds yield about 40–60% of carbon. Another satisfactory group of compounds are derivatives of polynuclear aromatic hydrocarbons contained in coal tar, such as dibenzanthracene, chrysene, etc. A preferred group of carbonaceous additives are polymers of aromatic hydrocarbons such as polyphenylene or polymethylphenylene which are soluble in aromatic hydrocarbons and yield up to 90% of carbon. However, the addition of elemental carbon directly to the silicon carbide powder is impractical, since it is very difficult to obtain the required degree of distribution and, frequently, large amounts of carbon inclusions are found after the hot pressing. Such inhomogeneities have, of course, a detrimental effect on strength because they initiate fractures and may entirely override the beneficial effect of the carbon additions.

An excellent way to introduce carbon into the submicron silicon carbide powders is by adding a solution of the carbonaceous substance which is decomposed to carbon on successive heat treatment. In making the carbon addition, the first step is to prepare a solution of the selected carbonaceous compound in a convenient solvent preferably having a moderately high melting point in case freeze drying is to be used. The powder is then dispersed in the desired amount of solution containing the necessary amount of the organic compound. The volume of the solvent required is an amount sufficient to yield a thin slurry when the silicon carbide powder is fully dispersed. The solvent is then evaporated either directly from the liquid dispersion or by freeze drying the dispersion and subliming off the solvent in vacuum. This latter procedure has the advantage, that it prevents inhomogeneities in the distribution of the additive which is always introduced on drying in the liquid state due to the migration of the solute. In this way, a uniform coating of the organic substance on the silicon carbide crystallites is obtained which yields the desired degree of carbon distribution.

Another approach to improved carbon distribution on a submicron particle size level is the application of jet milling. The silicon carbide powder is soaked with a solution of, for instance, a novolak resin in acetone, dried in air and heated up to 500° C. in nitrogen to pyrolyze the resin. The actual amount of carbon introduced by this process is determined as weight grain after the pyrolysis or by analysis of free carbon. The powder with the added carbon is then jet milled which greatly improves the distribution of carbon and eliminates major carbon grains in the hot pressed product.

There are several critical parameters during hot pressing which control the densification and microstructure of the final product. The most important of these are pressure, temperature, and time. While they will be discussed individually, it is readily apparent that these conditions are interdependent.

The pressure range useful for full densification is between about 5,000 to 10,000 psi. For general uses and for larger articles, the pressure is limited by available die materials and design. Thus for solid graphite dies the upper limit is about 5,000 psi and for graphite fiber-wound dies the upper limit is about 10,000 psi. It is advantageous to use a pressure close to the upper limit of 10,000 psi because the application of high pressure makes it possible to keep the temperature low enough to control the grain growth. Low pressures, below 5,000 psi, require the use of higher sintering temperatures or longer pressing time which will induce exaggerated grain growth.

The first indication of densification on heating up is obtained at or slightly above 1,600° C. which may be detected by the motion of the press ram. However, for all practical purposes high density cannot be obtained below 1,900° C. This limitation is imposed by the applicable pressure. At 10,000 psi and 1,900° C., a 96% relative density is obtained in 10 minutes and a 98% relative density is obtained in 30 minutes. By increasing the temperature to 1,950° C. and maintaining the pressure at 10,000 psi for 30 minutes, a density 3.20 g./cc. is reached corresponding to 99.6% of the theoretical. This pressing, when investigated metallographically, is pore-free. The microstructure obtained on these latter pressing conditions is uniform and fine-grained composed of about 3 microns sized grains. At 2,000° C. and 10,000 psi for 10 minutes the density obtained is still high, near theoretical, but the grain morphology changes. The grains become more elongated and isolated large tabular crystals form in the fine grain matrix. This exaggerated grain growth is more pronounced as the pressing time is extended or as the temperature is further increased. For instance, at 2,100° C. and 10,000 psi, tabular crystals as long as 1 mm. grow in 10 minutes and also large pores develop and consequently the density drops to about 3.15 g./cc. (98% of theoretical density). Thus, at the applied pressure, there is a fairly narrow temperature region from about 1,900° to 2,000° C., preferably near 1,950°, at which full densification along with a uniform microstructure can be obtained. The dramatic exaggerated grain growth may be attributed to the transformation of $\beta$-SiC into the $\alpha$-6H-SiC.

The time dependence in SiC densification, as in other sintering phenomena, is less significant in that pressing time cannot satisfactorily compensate for either decreased temperature or pressure. For instance, sintering at 1,900° and 10,000 psi yields 96% density in 10 minutes, and 98% in 30 minutes, while a total hold of 100 minutes brings only a marginal improvement. The sintering is usually complete within a time range of 10–60 minutes.

During hot pressing an atmosphere must be used which is inert to the silicon carbide. Thus, oxidizing atmospheres such as air cannot be used since they would tend to oxidize the silicon carbide to silica, interfere with sintering and degrade the high temperature properties. Useful inert atmospheres include argon, helium, and nitrogen.

As revealed by X-ray diffraction, electron diffraction and metallography, the fine grained SiC is composed of $\beta$-SiC and a varying small amount of $\alpha$-6H-SiC. Also present are minute carbon grains resulting from limited distribution of the carbonaceous additive as shown in FIG. 1. No separate boron containing phase was detected which suggests that boron formed a solid solution with SiC. One of the main features of our invention is the preparation of an essentially pore-free fine grained silicon carbide ceramic with outstanding mechanical and thermal properties which are essential for high temperature gas turbine application. The density of the product is at least 98% of the theoretical density.

My invention is further illustrated by the following examples:

EXAMPLE I

A solution of 123 g. of sucrose and 1.09 g. of $H_3BO_3$ in 90 cc. of water was added to 100 g. of tetraethylsilicate and the liquids were heated for 13 hours at 80° C. in a covered container. After this time, the hydrolysis was completed and the liquid turned into a soft gel. Alcohol was first allowed to evaporate and then the temperature was increased to 120° C. to drive off the excess water. Finally, the sucrose was decomposed by heating the mass to 300° C. for 2 hours. The resulting powder was fired for 2 hours in a carbon crucible at 1750° C. in argon. Excess carbon was eliminated by refiring the powder at 700° C. in air and $SiO_2$ formed during this procedure was leached out using a 5% solution of hydrofluoric acid.

An analysis of the yellow product showed in ppm:
300 Fe
50 Al
1200 $O_2$
8000 B

X-ray diffraction identified $\beta$-SiC

The specific surface area was 12 m²/g. giving ultimate crystalline size 0.2 $\mu$. This powder was hot-pressed to densities greater than 99% theoretical at 1950° C. and 10,000 psi, without additional processing.

EXAMPLE II

In accordance with the procedure of Example I, a submicron SiC powder doped with 0.4% boron was prepared and contained 0.35% oxygen and less than 0.2% total metallic impurities. The powder was dry ball-milled with 1% aluminum stearate addition for five hours and after that, dispersed in a 1% solution of polymethylphenylene in toluene.

The solvent was then evaporated at room temperature and the powder charged in a 1-inch bore graphite die and hot-pressed at 1950° C., 10,000 psi, for 30 minutes. The pressing had a density of 3.20 g./cc.; i.e., 99.5% of the theoretical and a fine-grained uniform microstructure as shown in FIG. 1 (500×). It was noted that exaggerated grain growth of α-6H silicon carbide was surpressed.

Figure 2:
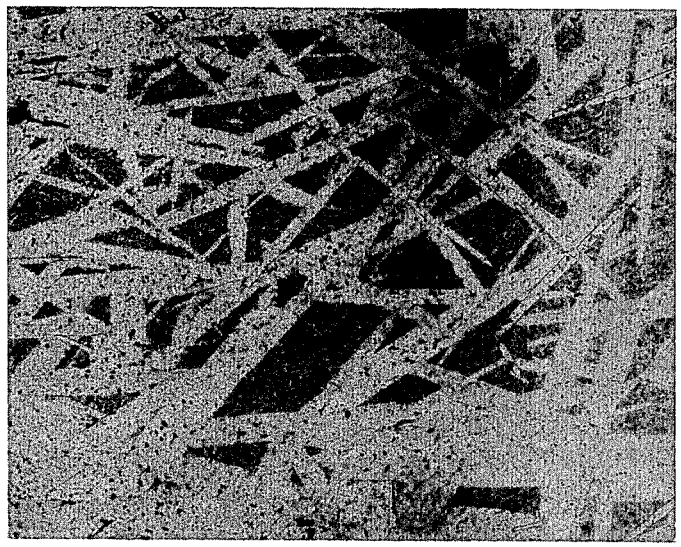
FIG. 2 is a photomicrograph of hot pressed silicon carbide doped with boron and containing no carbonaceous additive.

The same powder, when hot-pressed without carbon addition, yielded densities varying between 3.00 to 3.18 and its microstructure as represented by FIG. 2 (100×) showed pronounced exaggerated grain growth; i.e., large tabular grains, up to several hundred microns, in a fine-grained matrix.

Figure 3:
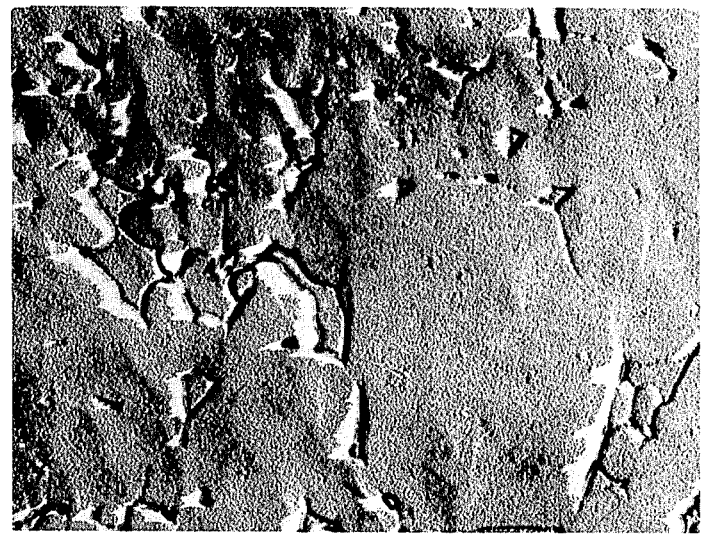
FIG. 3 is a photomicrograph of the hot pressed boron doped silicon carbide of FIG. 2 after being subjected to selective etching with hydrofluoric acid.

A sample prepared by hot pressing the boron doped silicon carbide powder without carbon addition at a temperature of 1950° C., 10 K psi for 30 minutes, had a density of 3.15 g./cc. Selective etching of polished sections with a 5% HF solution indicated the presence of silica. A detailed examination of the photomicrograph shown in FIG. 3 (30,000×) reveals that $SiO_2$ is distributed along SiC grain edges but does not form a continuous grain boundary phase.

High-temperature mechanical properties were evaluated with the following results:

| | No Carbon Addition | 1% Carbon as Polymethyl Phenylene |
|---|---|---|
| Bend Strength (3 point bending at 1600° C.) | 44,000 psi | 64,000 psi |
| Creep rate at 1600° C. per sec. (bending) | $1.3 \times 10^{-8}$ | $1.5 \times 10^{-9}$ |
| Time to Fracture at 1600° C.: | | |
| 40,000 psi | 3 minutes | >3000 minutes |
| 50,000 psi | — | >3000 minutes |
| 60,000 psi | — | 12 minutes |

EXAMPLE III

Following the procedure of Example I, a submicron SiC powder doped with 0.4% boron was prepared.

Sixty g. of the powder were then dispersed in 80 cc. of a 1% solution of phenol-formaldehyde novolac resin in acetone, the solvent was evaporated in air and the powder was calcined in a metal boat at 500° C. in flowing nitrogen atmosphere. An analysis of free carbon revealed the presence of 0.71%. Next, the powder was jet milled to break up the agglomerates of SiC and to improve the dispersion of carbon. The resulting particle size was $-2\mu$, with about 90% of the product in the submicron region.

The processed powder was then prepressed at 4,000 psi into a disc, placed in a graphite die 2 inches in diameter and hot-pressed at 1 torr of ambient pressure of argon at a temperature of 1950° C. and a pressure of 10 K psi for 30 minutes. The density was 3.19 g./cc. or 99.3% of the theoretical and an x-ray analysis gave lines of only β-SiC.

The microstructure of the obtained material was investigated on a thermally etched section. It revealed slightly elongated grains with an aspect ratio of about 2, average grain size was 3.5 microns. The largest detectable grains were about 15 microns. The modulus of rupture measured in three point bending at room temperature was 71,000 psi and showed an increase with temperature.

In a second run, the powder was hot-pressed without carbon addition under identical conditions. The density achieved was 97% of the theoretical and the microstructure showed large tabular grains of α-6H-SiC having a length of up to several hundred microns. The fraction of β-SiC transformed to α-SiC was 20%. The modulus of rupture at room temperature was 39,000 psi and was clearly limited by fracture initiation at the large grains intersecting the tensile surface.

| | Flexural Strength of Hot Pressed SiC (3 point bending) | |
|---|---|---|
| | No carbon addition | 0.7% carbon |
| Room temp. | 39,000 | 71,900 |
| 1300° C | 38,700 | 80,000 |
| 1400° C. | 37,500 | 81,900 |
| 1500° C. | 36,600 | 86,100 |

These results clearly indicate the improvement in flexural strength of the hot pressed boron doped SiC incorporating the carbonaceous additive as compared to a similar sample to which there had been no carbon addition.

It will be appreciated that the invention is not limited to the specific details shown in the examples and illustrations and that various modifications may be made within the ordinary skill in the art without departing from the spirit and scope of the invention.

We claim:

1. A method of making a hot-pressed silicon carbide ceramic body containing elemental carbon only in the form of minute particles interspersed throughout said body, said body having a density of at least 98% of theoretical density and having improved high temperature mechanical properties comprising the steps of
    (a) forming a substantially homogeneous dispersion consisting essentially of a submicron powder of silicon carbide, a boron additive selected from the group consisting of boron and boron carbide, wherein the amount of the boron additive is equivalent to about 0.3–3.0% by weight of boron, and about 0.5 to 3.0% by weight of elemental carbon, and
    (b) hot pressing the dispersion in an inert atmosphere at a temperature of about 1,900°–2,000° C. and at a pressure of about 5,000–10,000 psi for a sufficient time ranging from about 10 minutes to about 60 minutes to produce said hot-pressed silicon carbide body.

2. The method of claim 1 wherein the inert atmosphere is argon, the temperature is about 1,950° C, the pressure is about 10,000 psi and the time is about 30 minutes.

3. A method of making a hot-pressed silicon carbide ceramic body containing elemental carbon only in the form of minute particles interspersed throughout said body, said body having a density of at least 98% of theoretical density and having improved high temperature mechancal properties comprising the steps of
    (a) forming a substantially homogeneous first dispersion of a submicron powder of silicon carbide, a boron additive selected from the group consisting of boron and boron carbide, wherein the amount of the boron additive is equivalent to about 0.3–3.0% by weight of boron, (b) incorporating into said first dispersion a carbonaceous additive, in an amount equivalent to about 0.5–3.0% by weight of elemental carbon after pyrolysis, to form a second dispersion, (c) pyrolyzing said second dispersion at a temperature which decomposes the carbonaceous additive to elemental carbon, and (d) hot pressing the resulting pyrolyzed dispersion consisting essentially of silicon carbide, said boron additive and elemental carbon in an inert atmosphere at a temperature of about 1,900°–2,000° C. and at a pressure of about 5,000–10,000 psi for a sufficient time ranging from about 10 minutes to about 60 minutes to produce said hot-pressed silicon carbide body, said pyrolyzing having no significant deteriorating effect on the properties of said hot-pressed body.

4. The method of claim 3, wherein said firsst dispersion is formed by the steps comprising forming a silica gel in a solution containing sugar and boric acid, dehydrating the gel to form a finely divided mixture and heating the mixture in an inert atmosphere to form a boron doped silicon carbide powder.

5. The method of claim 3 wherein said carbonaceous additive is a phenolformaldehyde condensate resin.

6. The method of claim 3 wherein said carbonaceous additive is polyphenylene.

7. The method of claim 3 wherein said carbonaceous additive is polymethylphenylene.

* * * * *